(12) United States Patent
Gordner

(10) Patent No.: US 11,499,473 B2
(45) Date of Patent: Nov. 15, 2022

(54) COMPRESSOR FOR AN INTAKE SECTION OF AN INTERNAL COMBUSTION ENGINE OF A MOTOR VEHICLE, INTERNAL COMBUSTION ENGINE FOR A MOTOR VEHICLE, AND MOTOR VEHICLE

(71) Applicant: Bayerische Motoren Werke Aktiengesellschaft, Munich (DE)

(72) Inventor: Achim Gordner, Grossberghofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/293,656

(22) PCT Filed: Oct. 24, 2019

(86) PCT No.: PCT/EP2019/078996
§ 371 (c)(1),
(2) Date: May 13, 2021

(87) PCT Pub. No.: WO2020/099090
PCT Pub. Date: May 22, 2020

(65) Prior Publication Data
US 2022/0010723 A1    Jan. 13, 2022

(30) Foreign Application Priority Data

Nov. 16, 2018   (DE) ..................... 10 2018 128 827.1

(51) Int. Cl.
*F02D 41/00*       (2006.01)
*F02D 23/00*       (2006.01)
(Continued)

(52) U.S. Cl.
CPC ....... *F02B 39/10* (2013.01); *F02M 35/10091* (2013.01); *F02M 35/10157* (2013.01);
(Continued)

(58) Field of Classification Search
CPC ................ F02D 41/0007; F02D 23/00; F02M 35/10157; H02K 1/27; H02K 1/2753; H02K 7/085; H02K 9/06; F04D 29/284
See application file for complete search history.

(56) References Cited

U.S. PATENT DOCUMENTS 5,654,598 A    8/1997  Horski
6,512,305 B1*  1/2003  Pinkerton .............. H02K 7/025
                                                  290/46
(Continued)

FOREIGN PATENT DOCUMENTS

CN    2523102 Y    11/2002
CN    101684785 A    3/2010
(Continued)

OTHER PUBLICATIONS

PCT/EP2019/078996, International Search Report dated Jan. 21, 2020 (Two (2) pages).
(Continued)

*Primary Examiner* — Long T Tran
(74) *Attorney, Agent, or Firm* — Crowell & Moring LLP

(57) ABSTRACT

A compressor for an intake section of an internal combustion engine of a motor vehicle includes an electric motor which has a stator and a rotor where the rotor is drivable by the stator and is rotatable about an axis of rotation relative to the stator. An impeller is drivable by the rotor to compress air which is flowable through the intake section and which is to be supplied to a combustion chamber of the internal combustion engine. The rotor is a brushless external rotor such that at least one length region of the stator is disposed in at least one length region of the rotor.

13 Claims, 1 Drawing Sheet

(51) Int. Cl.

| | | |
|---|---|---|
| *H02K 1/27* | (2022.01) | |
| *H02K 7/00* | (2006.01) | |
| *F02B 39/10* | (2006.01) | |
| *F02M 35/10* | (2006.01) | |
| *F16C 21/00* | (2006.01) | |
| *H02K 7/08* | (2006.01) | |
| *H02K 9/06* | (2006.01) | |
| *H02K 21/24* | (2006.01) | |

(52) U.S. Cl.
CPC ............ *F16C 21/00* (2013.01); *H02K 7/085* (2013.01); *H02K 9/06* (2013.01); *H02K 21/24* (2013.01); *F16C 2380/26* (2013.01)

(56) References Cited

U.S. PATENT DOCUMENTS

| | | | |
|---|---|---|---|
| 6,668,553 B1 | 12/2003 | Ghizawi | |
| 6,865,888 B2 | 3/2005 | Gruendl et al. | |
| 10,291,103 B2* | 5/2019 | Holman | H02K 1/2786 |
| 2006/0260305 A1* | 11/2006 | Ishiwatari | F02B 37/12 60/599 |
| 2008/0047268 A1* | 2/2008 | Isogai | F02B 39/10 60/608 |
| 2009/0139079 A1* | 6/2009 | Shibui | H02K 7/04 310/156.28 |
| 2009/0195102 A1* | 8/2009 | Shibui | H02K 1/2733 310/156.28 |
| 2010/0266430 A1* | 10/2010 | Shimizu | F02B 39/10 417/423.8 |
| 2018/0109164 A1 | 4/2018 | Holman | |
| 2018/0242800 A1 | 8/2018 | Hayamitsu et al. | |
| 2019/0003488 A1 | 1/2019 | Stefanovic et al. | |
| 2019/0207448 A1* | 7/2019 | Ozasa | H02K 1/2753 |
| 2019/0383210 A1* | 12/2019 | Sieber | F04D 25/0606 |
| 2020/0112227 A1* | 4/2020 | Kou | A01D 34/78 |

FOREIGN PATENT DOCUMENTS

| | | |
|---|---|---|
| CN | 102187099 A | 9/2011 |
| CN | 202856524 U | 4/2013 |
| CN | 103717855 A | 4/2014 |
| CN | 107061000 A | 8/2017 |
| CN | 108368852 A | 8/2018 |
| DE | 197 01 100 A1 | 7/1998 |
| DE | 100 24 390 A1 | 12/2001 |
| DE | 102 21 843 A1 | 12/2003 |
| DE | 10 2009 009 898 A1 | 8/2010 |
| DE | 202016102314 U1 | 9/2016 |
| EP | 2 908 409 B1 | 8/2015 |
| WO | WO 97/08808 A1 | 3/1997 |
| WO | WO 2013/020632 A1 | 2/2013 |

OTHER PUBLICATIONS

German Search Report issued in German application No. 10 2018 128 827.1 dated Oct. 16, 2019, with Statement of Relevancy (Eight (8) pages).

Chinese Office Action issued in Chinese application No. 201980064624.0 dated Jun. 6, 2022, with English translation (Eighteen (18) pages).

\* cited by examiner

COMPRESSOR FOR AN INTAKE SECTION OF AN INTERNAL COMBUSTION ENGINE OF A MOTOR VEHICLE, INTERNAL COMBUSTION ENGINE FOR A MOTOR VEHICLE, AND MOTOR VEHICLE

BACKGROUND AND SUMMARY OF THE INVENTION

The invention relates to a compressor for an intake section of an internal combustion engine of a motor vehicle. In addition, the invention relates to an internal combustion engine for a motor vehicle. The invention also relates to a motor vehicle, in particular a car.

EP 2 908 409 B1 discloses an electric motor of an auxiliary unit of a motor vehicle, having an electronically commutated motor stator and control electronics for activating the stator coils forming the motor stator. Furthermore, a sealed electronics compartment is provided in which the control electronics are arranged. The electric motor also comprises a potting body in the electronics compartment, with the control electronics being potted in the potting body. The electric motor can be an electric motor of an electric water pump and can be configured here as an external rotor which has a pot shaped motor rotor which is arranged around a central coaxial motor stator.

Furthermore, DE 197 01 100 A1 discloses an air conditioning device for influencing the temperature of closed housing interiors.

It is the object of the present invention to further develop a compressor, an internal combustion engine and a motor vehicle of the type mentioned at the beginning in such a manner that the requirement of the compressor for construction space can be kept within particularly low limits.

A first aspect of the invention relates to a compressor for an intake section, also referred as an inlet section, of an internal combustion engine, configured, for example, as a reciprocating piston engine, of a motor vehicle, in particular of a car configured, for example, as a passenger car. The compressor has an electric machine which is configured as an electric motor and which has a stator and a rotor. The rotor is drivable by the stator and is rotatable as a result about an axis of rotation relative to the stator. Driving of the rotor enables the electric motor to provide, i.e., output, at least a torque via the rotor. Furthermore, the compressor has at least one, or preferably precisely one, compressor impeller, which is also referred to as an impeller. The compressor impeller can be driven by the rotor or by means of the torque and can thereby be rotated, for example, about the axis of rotation and/or relative to the stator. Driving of the compressor impeller enables air to be compressed, the air flowing through the intake section and being conducted by means of the intake section into at least one combustion chamber of the internal combustion engine. The combustion chamber is configured, for example, as a cylinder or as part of a cylinder. In other words, the air flowing through the intake section can be compressed by means of the compressor impeller.

The compressor impeller can be driven here by the electric machine via the rotor, as a result of which the air flowing through the intake section is compressed by means of the compressor impeller. Since the compressor impeller is drivable by the electric motor, the compressor is configured as an electric compressor, i.e., as an electrically operable, electrically drivable or electrically driven compressor. In contrast to a mechanical compressor, the electric compressor according to the invention is not drivable or is drivable not only mechanically by an output shaft in the form, for example, of a crankshaft of the internal combustion engine, but rather the fan wheel can be driven by means of the electric motor using electrical energy.

In order now to be able to realize a particularly compact design of the compressor and thus to be able to keep the requirement of the compressor for construction space within particularly low limits, it is provided according to the invention that the electric motor is configured as a brushless external rotor such that or as a result of which at least one length region of the stator is arranged or accommodated in at least one length region of the rotor. In particular, for example, the stator is at least predominantly, in particular completely, accommodated in the rotor such that the rotor, for example, surrounds the stator at least predominantly, in particular completely. In particular, it is provided that the length region of the rotor surrounds the length region of the stator in a completely encircling manner in the circumferential direction of the stator. The external rotor is also referred to as an external rotor motor or external rotor machine. In contrast to what is called an internal rotor, in particular a brushless internal rotor, in which the rotor lies on the inside, i.e., is at least partially arranged in the stator, provision is made in the case of the external rotor according to the invention for the stator to lie on the inside, i.e., for the stator to be arranged in the rotor.

The motor vehicle is preferably configured as a single track motor vehicle having at least or precisely two wheels and is preferably configured as a motorcycle. In particular in the case of a motorcycle, it is of particularly advantage if the requirement of the compressor for construction space and the weight thereof can be kept within particularly low limits. This can be realized by means of the compressor according to the invention.

In order to keep the requirement for construction space within particularly low limits, the compressor impeller is integrated, for example, directly in the rotor, which is also referred to as an external rotor. The compressor impeller is preferably connected to the rotor, in particular to a rotor shaft of the rotor, for rotation therewith.

In order to keep the requirement for construction space and the number of parts particularly low, it is preferably provided that the compressor impeller is configured integrally with the rotor shaft. The configuration of the electric motor as an external rotor is a design by means of which the dimensions and the weight of the electric motor can be significantly reduced in comparison to internal rotors. In addition, the rotor of the electric motor, because the rotor lies on the outside, can be cooled particularly advantageously by an air flow or by air which is, for example, conveyed and preferably compressed by means of the compressor impeller. This makes it possible to avoid, or at least keep small, separate cooling measures which are intensive in terms of weight, construction space and costs, and therefore the costs, the number of parts, the requirement of the compressor for construction space and the weight of the compressor according to the invention can be kept within particularly low limits.

In order to keep the requirement for construction space particularly low, the compressor impeller is preferably configured as a radial compressor impeller, and therefore the compressor according to the invention is preferably configured as a radial compressor. This means, for example, that, during operation of the compressor, the air flows to the compressor impeller in the axial direction of the compressor impeller. The air flowing to the compressor impeller in the axial direction is compressed by means of the compressor impeller and flows away from the compressor impeller in the radial direction of the compressor impeller during operation. Here, for example, the axial direction of the compressor impeller coincides overall with the axial direction of the electric motor, and the axial direction of the electric motor or of the compressor impeller coincides with the axis of rotation. In addition, the radial direction of the compressor impeller coincides overall with the radial direction of the electric motor. By means of the configuration of the compressor impeller as a radial compressor impeller, in particular the axial requirement for construction space can be kept within particularly low limits.

It has furthermore been shown to be advantageous if the compressor according to the invention is free from an external rotor compressor impeller which surrounds the compressor impeller and rotates or can rotate, for example, in an opposed manner to the compressor impeller. In other words, the compressor preferably does not comprise an external rotor compressor impeller which surrounds the compressor impeller and, for example, runs opposed relative to the compressor impeller, such that the requirement for construction space, the number of parts, the weight and the costs can be kept within particularly low limits.

In order to be able to realize particularly compact external dimensions, it is provided, in an advantageous refinement of the invention, that the stator has a plurality of coils which can be supplied with electric current or through which electric current can flow.

A further embodiment is distinguished in that the rotor has a plurality of magnets, in particular permanent magnets. A particularly simple and therefore favorable design in terms of construction space and costs can thereby be ensured.

In a particularly advantageous embodiment of the invention, the rotor is at least partially, in particular at least predominantly or completely, accommodated in a housing. In addition, the rotor is mounted rotatably on the housing via a bearing device. The stator is preferably also at least partially, in particular at least predominantly or completely, accommodated in the housing. The bearing device can have, for example, at least one or more bearing positions, wherein the bearing positions, for example, can be spaced apart from one another, in particular in the axial direction of the electric motor, and/or can follow one another. This can ensure a compact bearing arrangement.

It has been shown to be particularly advantageous here if the bearing device has at least one plain bearing and/or at least one ceramic rolling bearing. A bearing arrangement of the rotor which is advantageous in terms of construction space and has low friction can thereby be ensured.

In order to be able to keep the requirement of the compressor for construction space particularly low, it is provided, in a further refinement of the invention, that the housing has a first receiving chamber, in which the impeller is at least partially, in particular at least predominantly or completely, arranged or accommodated. During the operation, the air which is to be compressed by means of the compressor impeller flows, for example, into the first receiving chamber and through the first receiving chamber such that the air to be compressed by means of the compressor impeller flows in the first receiving chamber toward the compressor impeller, in particular in the axial direction, and flows away optionally in the radial direction.

The housing also has a second receiving chamber in which the bearing device and therefore, for example, at least one part of the rotor and preferably also at least one part of the stator are accommodated. The rotor extends from the second receiving chamber through a through opening, in particular in the housing, into the first receiving chamber such that the receiving chambers are connected to one another per se via the through opening. The rotor is therefore partially arranged in the first receiving chamber and partially in the second receiving chamber. The rotor here penetrates the through opening such that the rotor, in particular the rotor shaft thereof, is mounted rotatably on the housing in the second receiving chamber via the bearing device. In the first receiving chamber, the rotor is connected to the compressor impeller for rotation therewith. The rotor in the first receiving chamber can be configured integrally with the compressor impeller. The through opening is at least partially, in particular at least predominantly or completely, covered or overlapped here by the compressor impeller in a direction coinciding with the axial direction of the electric motor and pointing away from the through opening and pointing toward the compressor impeller. In other words, the compressor impeller at least partially, in particular at least predominantly or completely, covers or overlaps the through opening in the described direction.

In order, in a manner which is particularly advantageous in terms of construction space, to be able to realize particularly advantageous cooling at least of the bearing device and preferably also of the coils which are mentioned and which are arranged, for example, in the second receiving chamber, it is provided, in a further refinement of the invention, that the impeller has at least one air duct. The air duct leads at one end into the first receiving chamber. At the other end, the air duct leads into the second receiving chamber. As a result, at least some of the air from the first receiving chamber can be conducted into the second receiving chamber via the air duct such that the bearing device and preferably the coils can be cooled by means of the air which flows through the air duct and is conducted into the second receiving chamber via the air duct.

It has been shown to be advantageous for implementing particularly advantageous cooling if the compressor impeller, in particular the air duct, is configured to compress the air which flows through the air duct and is therefore conducted into the second receiving chamber by means of the air duct.

In a further particularly advantageous embodiment of the invention, a wall region of the housing outwardly adjoining the through opening in the radial direction of the electric motor and at least one partial region of an impeller back of the compressor impeller, which partial region faces the wall region, bound at least one guide duct via which at least some of the air flowing, for example, into the first receiving chamber can be conducted from the first receiving chamber to the through opening and through the latter. This enables the bearing device to be supplied particularly simply and advantageously in terms of construction space with air from the first receiving chamber, as a result of which the bearing device can be particularly advantageously cooled.

It has been shown to be particularly advantageous if the compressor impeller is configured to convey through the guide duct at least some of the air flowing through the guide duct and to compress the air flowing through the guide duct.

In order to be able to keep the external dimensions of the compressor within particularly low limits, it is provided, in a further refinement of the invention, that the housing has a first outer circumference in a first length region and a second outer circumference which is smaller than the first outer circumference in a second length region. The first length region has the first receiving chamber, in particularly completely, or the first length region comprises the first receiving chamber, in particular completely. In addition, the second length region has the second receiving chamber or the second length region comprises the second receiving chamber, in particular completely.

A second aspect of the invention relates to an internal combustion engine for a motor vehicle, in particular for a car, such as, for example, a passenger car. The internal combustion engine has at least one combustion chamber, which is configured, for example, as a cylinder, and an intake section, through which air can flow and which is also referred to as an inlet section and by means of which the air can be guided into the combustion chamber. Furthermore, the internal combustion engine comprises a compressor which is arranged in the intake section, in particular a compressor according to the invention according to the first aspect of the invention. The compressor has an electric motor, which has a stator and a rotor. The rotor is drivable by the stator and is rotatable as a result about an axis of rotation relative to the stator. In addition, the compressor has at least one or preferably precisely one compressor impeller which is drivable by the rotor in order to compress the air flowing through the intake section. During operation of the compressor, the compressor impeller rotates in preferably precisely one direction of rotation about the axis of rotation relative to the stator, wherein, during the operation, the air flowing through the intake section is compressed by means of the compressor impeller.

In order to be able to keep the requirement of the compressor for construction space particularly low, it is provided according to the invention that the electric motor is configured as a brushless external rotor such that at least one length region of the stator is arranged in at least one length region of the rotor. Advantages and advantageous refinements of the first aspect of the invention should be considered to be advantages and advantageous refinements of the second aspect of the invention, and vice versa.

A third aspect of the invention relates to a motor vehicle which is configured, for example, as a car, in particular as a passenger car, and has at least one compressor according to the invention according to the first aspect of the invention and/or at least one internal combustion engine according to the invention according to the second aspect of the invention. Advantages and advantageous refinements of the first aspect of the invention and of the second aspect of the invention should be considered to be advantages and advantageous refinements of the third aspect of the invention, and vice versa.

Since the air flowing through the intake section can be compressed by means of the electric compressor, an increase in power can be obtained by means of the compressor, for example in relation to internal combustion engines in which the air is not compressed. Particularly advantageous operation meeting requirements can be realized by the fact that the compressor impeller can be driven by means of the electric motor.

Further details of the invention emerge from the description below of preferred exemplary embodiments with the associated drawings.

DETAILED DESCRIPTION OF THE DRAWINGS

In the figures, identical or functionally identical elements are provided with the same reference signs.

Figure 1:
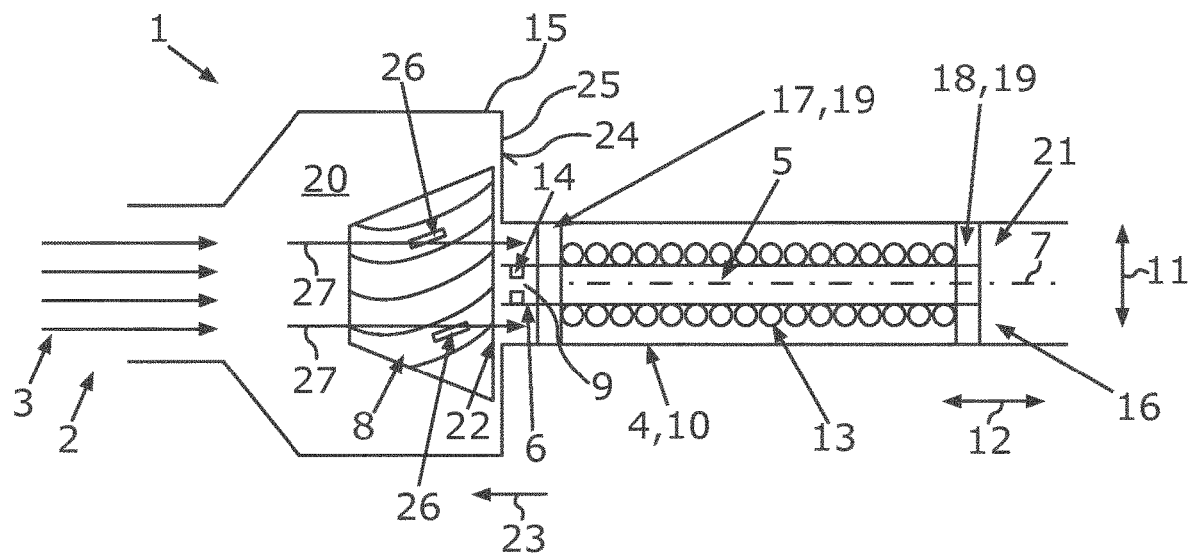
FIG. 1 shows a schematic and sectioned side view of a compressor according to the invention according to a first embodiment.

FIG. 1 shows, in a schematic and sectioned side view, a compressor 1 for an intake section of an internal combustion engine of a motor vehicle, in particular of a single track motor vehicle. The motor vehicle is preferably configured as a motorcycle, wherein the motor vehicle has at least or precisely two wheels. The wheels are arranged one behind the other in the longitudinal direction of the vehicle and are held rotatably on a frame such that the respective wheel is rotatable about a respective wheel axis of rotation relative to the frame. The wheel axes of rotation are arranged one behind another in the longitudinal direction of the vehicle and are therefore offset from one another in the longitudinal direction of the vehicle, wherein the wheel axes of rotation run parallel to one another when the motor vehicle travels straight ahead. The internal combustion engine is configured, for example, as a reciprocating piston engine and has at least one combustion chamber, which is configured, for example, as a cylinder. The motor vehicle is drivable by means of the internal combustion engine. The compressor 1 is arranged in the intake section, part of which can be seen in FIG. 1 and is denoted by 2. Air can flow through the intake section 2 and is guided by means of the intake section 2 to the combustion chamber. During a fueled mode of the internal combustion engine, the combustion chamber is supplied with fuel, in particular with liquid fuel, and with the air Christopher Allen KADOCH, et al flowing through the intake section 2 such that a fuel air mixture is formed in the combustion chamber. The fuel air mixture is burned, resulting in exhaust gas from the internal combustion engine. The air flowing through the intake section 2, in particular the flow of air, is illustrated by arrows 3 in FIG. 1.

The compressor 1 is configured as an electric compressor and accordingly has an electric motor 4 which comprises a stator 5 and a rotor 6. The rotor 6 is rotatable about an axis of rotation 7, also referred to as motor axis of rotation, relative to the stator 5. The rotor 6 is drivable by the stator 5 and is rotatable as a result about the axis of rotation 7 relative to the stator 5. In other words, during operation of the compressor 1, the air flowing through the intake section 2 is compressed by means of the compressor 1, and, for this purpose, the rotor 6 is driven by the stator 5 and is rotated as a result about the axis of rotation 7 relative to the stator 5.

The compressor 1 has at least or preferably precisely one compressor impeller 8, which is also referred to as an impeller and is drivable, or is driven during the operation, by the rotor 6 and thus by the electric motor 4 via the rotor 6 in order to compress the air flowing through the intake section 2. The rotor 6 has, for example, at least or precisely one rotor shaft 9 which is rotatable about the axis of rotation 7 relative to the stator 5. The compressor impeller 8 is connected to the rotor shaft 9 for rotation therewith, wherein the compressor impeller 8 can be formed integrally with the rotor shaft 9.

In order now to be able to realize a particularly compact design of the compressor 1 and thus to keep the requirement of the compressor 1 for construction space within particularly low limits, the electric motor 4 is configured as a brushless external rotor 10 such that the stator 5 is at least partially, in particular at least predominantly, arranged or accommodated in the rotor 6. In other words, at least one length region of the stator 5 is arranged in at least one length region of the rotor 6 such that at least the length region of the stator 5 in the radial direction of the electric motor 4 and thus of the compressor impeller 8 is outwardly covered at least by the length region of the rotor 6. The radial direction of the electric motor 4 and therefore of the compressor impeller 8 is illustrated by a double arrow 11 in FIG. 1 and runs perpendicularly to the axis of rotation 7 and perpendicularly to the axial direction of the electric motor 4 and thus of the compressor impeller 8. The axial direction of the electric motor 4 and of the compressor impeller 8 is illustrated by a double arrow 12 in FIG. 1. In addition, the axial direction of the electric motor 4 coincides with the axis of rotation 7.

It can be seen from FIG. 1 that the stator 5 has a plurality of coils 13 which can be supplied with electrical current. The electrical current with which the coils 13 are supplied during the operation of the compressor 1 flows through the coils 13 during the operation. The coils 13 are formed, for example, by at least one winding or by a plurality of windings of the stator 5. The rotor 6 has magnets 14, which are illustrated particularly schematically in FIG. 1 and are preferably configured as permanent magnets.

The rotor 6, the stator 5 and the compressor impeller 8, which is also referred to as an impeller, are in each case at least partially, in particular at least predominantly or completely, accommodated in a housing 15 of the compressor 1. The housing 15 is, for example, at least part of the intake section 2. As can be seen from FIG. 2, the air which is to be compressed by means of the compressor impeller 8 can flow through the housing 15. The stator 5 is held at least indirectly, in particular directly, on the housing 15: the stator 5 is secured on the housing 5, for example, so as to be rotationally fixed at least with respect to the axis of rotation 7 such that relative rotations between the stator 5 and the housing 15 at least about the axis of rotation 7 are prevented. This means that the stator 5 is secured, in particular at least indirectly and preferably directly, on the housing 15 against rotations running about the axis of rotation 7 and taking place relative to the housing 15.

By contrast, the rotor 6 is mounted on the housing 15 rotatably via a bearing device 16 of the compressor 1. The bearing device 16 has at least or precisely two bearing positions 17 and 18 which are spaced apart from one another in the axial direction of the electric motor 4 and thus in the axial direction of the compressor impeller 8 and of the rotor 6. Arranged at the respective bearing position 17 and 18 is a bearing element 19 via which the rotor and, via the latter, the compressor impeller 8 are mounted, and therefore supported, on the housing 15 so as to be rotatable at least in the radial direction. In particular, the rotor 6 is mounted rotatably on the housing 15 via the rotor shaft 9 and the bearing elements 19, as a result of which the rotor 6 is supported on the housing 15 so as to be rotatable in the radial direction via the rotor shaft 19.

The respective bearing element 19 can be configured, for example, as a plain bearing or plain bearing arrangement, or the respective bearing element 19 can be configured as a rolling bearing or rolling bearing arrangement. The rolling bearing is preferably configured as a ceramic rolling bearing. If the respective bearing element 19 is configured as a plain bearing, a lubricant supply device, for example, is provided. The respective plain bearing can be supplied with an in particular liquid or viscous lubricant, for example oil, by means of the lubricant supply device. In other words, it is preferably provided that, during the operation of the compressor 1, the respective plain bearing is supplied with the lubricant and is thereby lubricated. Since the bearing device 16 and thus the bearing positions 17 and 18 and the bearing elements 19 follow the compressor impeller 8 in the axial direction and are arranged on a common side of the compressor impeller 8, the bearing device 16 is configured as an inner bearing arrangement.

The impeller can be integrated directly into the rotor 6, which is also referred to as an outer rotor, and therefore, for example, the compressor impeller 8 is formed integrally with the rotor shaft 9. Since the rotor 6 of the electric motor 4 lies on the outside, i.e., is arranged on the stator, the rotor 6 is cooled by an air flow, i.e., for example, at least by some of the air which is conveyed and compressed by means of the compressor impeller 8 during the operation.

The compressor impeller 8 is preferably configured as a radial compressor impeller, and therefore the compressor 1 is preferably configured as a radial compressor. This means that, during the operation of the compressor 1, the air flows to the compressor impeller 8 in the axial direction and flows away in the radial direction.

The housing 15 has a first receiving chamber 20 in which the compressor impeller 8 is arranged. In addition, the housing 15 has a second receiving chamber 21 in which the bearing device 16 is accommodated. In this case, for example, the receiving chamber 20 has a first inner circumference, in particular a first inner diameter, while the second receiving chamber 21 has a second inner circumference, in particular a second inner diameter. The second inner circumference, in particular the second inner diameter, is smaller than the first inner circumference, in particular than the first inner diameter. The rotor 6 is thus mounted rotatably on the housing 15 in the receiving chamber 21, in particular via the rotor shaft 9. The rotor 6, in particular the rotor shaft 9, extends from the second receiving chamber 21 though a through opening 22 of the housing 15 into the first receiving chamber 20 such that the rotor 6 penetrating the through opening 22 is arranged partially in the receiving chamber 20 and partially in the receiving chamber 21. The through opening 22 is covered completely by the compressor impeller 8, in particular by an impeller back 24, which faces the through opening 22, of the compressor impeller 8, in a direction coinciding with the axial direction of the electric motor 4, pointing away from the through opening 22, pointing toward the compressor impeller 8 and illustrated in FIG. 1 by an arrow 23.

FIG. 1 shows a first embodiment in which the compressor impeller 8, in particular the impeller back 24, is arranged particularly close to the through opening 22 in the axial direction. The compressor impeller is thereby arranged particularly close in the axial direction to a wall region 25 of the housing 15 directly adjoining the through opening 22 in the radial direction. For example, the wall region 35 bounds the through opening 22. In the first embodiment, an only very small or narrow gap, in particular an air gap, is arranged in the axial direction between the impeller back 24 and the wall region 25. No air or an only very small quantity of air can flow through the small air gap. The air gap is therefore insufficient for being able to guide a sufficient quantity of air from the receiving chamber 20 via the gap into the receiving chamber 21 and being able to sufficiently cool the bearing device 16.

In order, nevertheless, to be able to realize particularly advantageous cooling, which is advantageous in terms of construction space, of the bearing device 16 arranged in the receiving chamber 21 and of the coils 13 arranged in the receiving chamber 21, the compressor impeller 8 has a plurality of air ducts 26 leading at one end into the first receiving chamber 20 and at the other end into the second receiving chamber 21. At least some of the air located initially in the first receiving chamber 20 can be conducted out of the first receiving chamber 20 into the second receiving chamber 21 via the air ducts 26. As a result, the bearing device 16 and the coils 13 are cooled by means of the air flowing through the air ducts 26 and introduced via the latter into the receiving chamber 21. Arrows 27 in FIG. 1 illustrate the air which flows through the air ducts 26 and is guided by means of the air ducts 26 from the receiving chamber 20 into the receiving chamber 21. As a result, this air can cool the bearing device 16 and the coils 13. It is furthermore conceivable for the bearing device 16 and the coils 13 in the receiving chamber 21 to be cooled by means of ambient air. The described cooling of the bearing device 16 and of the coils 13 is based, for example, on the principle of radial compression. This means, for example, that the air flowing out of the receiving chamber 20 into the receiving chamber 21 via the air ducts 26 is compressed by means of the compressor impeller 8, in particular by means of the air ducts 26. Particularly effective and efficient cooling of the bearing device 16 and of the coils 13 can thereby be ensured.

The respective air duct 26 is configured, for example, as a slot, in particular of a narrow slot, which is incorporated, for example, into the impeller. The air is compressed by the narrow slots and can thus advantageously cool the rotor.

Figure 2:
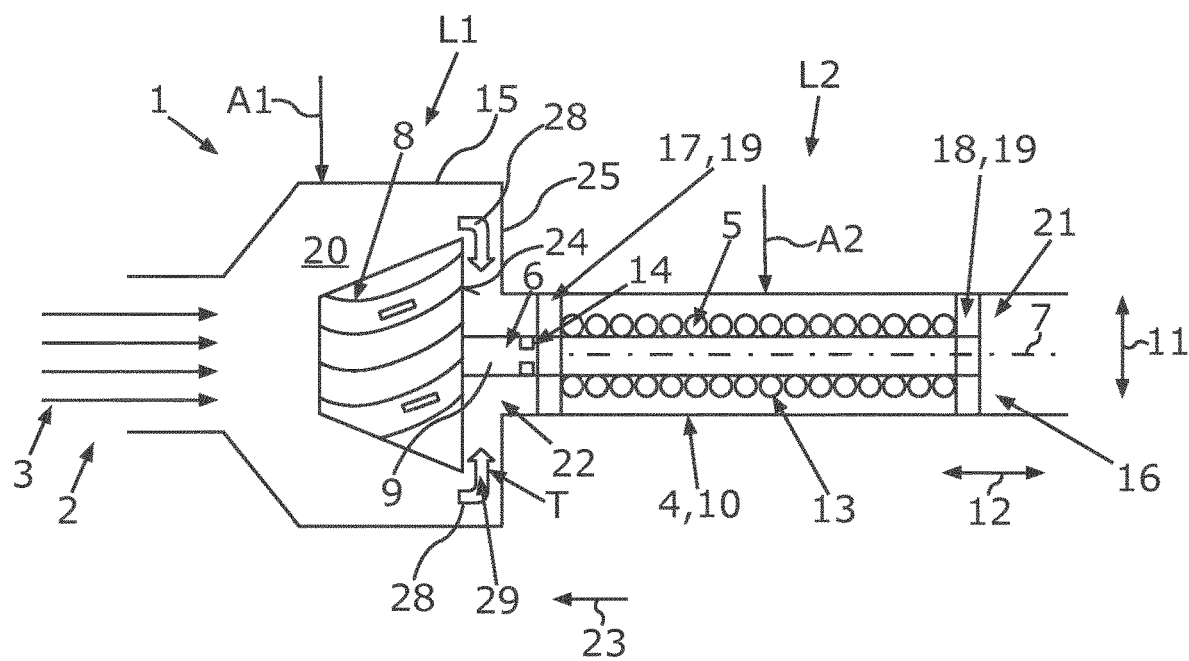
FIG. 2 shows a schematic and sectioned side view of the compressor according to a second embodiment.

FIG. 2 shows a second embodiment of the compressor 1. The second embodiment differs from the first embodiment in particular by the fact that the compressor impeller 8 does not have the air ducts 26. In order, nevertheless, to be able to supply the bearing device 16, which is arranged in the receiving chamber 21, and the coils 13, which are arranged in the receiving chamber 21, sufficiently with air acting as cooling air and thereby sufficiently cool them, the impeller back 24 is spaced apart substantially further in the axial direction from the wall region 25 than in the first embodiment. By this means, the wall region 25 of the housing 15 outwardly directly adjoining the through opening 22 in the radial direction of the electric motor 4 and at least one partial region T of the impeller back 24 of the compressor impeller 8, which partial region T faces the wall region 25, bound at least one guide duct 29 which is configured, for example, as an annular duct. As is illustrated in FIG. 2 by arrows 28, a sufficient quantity of air from the receiving chamber 20 can flow through the guide duct 29 such that at least some of the air from the first receiving chamber 20 can be guided or can be conducted via the guide duct 29 to the through opening 22 and through the latter. In this case, for example, the compressor impeller 8 is configured to convey at least the previously mentioned portion of the air from the receiving chamber 20 through the guide duct 29. In addition, the compressor impeller 8 is preferably configured to compress the portion of the air flowing through the guide duct 29, i.e., the air which flows through the guide duct 29. In other words, it is provided, in the second embodiment, that the air flowing through the guide duct 29, which air flows on the side of the impeller back 24 and therefore behind the compressor impeller 8, is compressed behind the impeller. By this means, the bearing device 16 and the coils 13 can be particularly well cooled.

Furthermore, it is possible that, in the case of the first embodiment and in the case of the second embodiment, the rotor 6, in particular a part of the rotor 6 which is arranged in the receiving chamber 21, is cooled by means of the air which is guided or conducted in the described manner from the receiving chamber 20 into the receiving chamber 21.

In order to be able to keep the requirement of the compressor 1 for construction space particularly low, the housing 15 has a first outer circumference A1, in particular a first outer diameter, in a first length region L1 completely comprising or having the first receiving chamber 21. In addition, the housing 15 has a second outer circumference A2, in particular a second outer diameter, in a second length region L2 which adjoins the length region L1, in particular directly, in the axial direction and completely has or comprises the receiving chamber 21. The second outer circumference A2, in particular the second outer diameter, is smaller than the first outer circumference A1, in particular the first outer diameter. In particular, for example, the first outer circumference A1, in particular the first outer diameter, is at least twice as large as the second outer circumference A2, in particular the second outer diameter. As a result, for example, the compressor 1 can be arranged and thus stowed particularly advantageously in an available construction space.

In comparison to compressors with internal rotors, the overall size and the weight of the compressor 1 and thus also of the external rotor 10 can be considerably reduced. The compressor 1 can thereby be used particularly advantageously in the motorcycle sector and thus for a motorcycle. Furthermore, it is conceivable to use the compressor 1 in the automobile sector, and therefore the motor vehicle can be configured, for example, as a car, in particular as a passenger car.

LIST OF REFERENCE CHARACTERS

1 Compressor
2 Intake section
3 Arrows
4 Electric motor
5 Stator
6 Rotor
7 Axis of rotation
8 Compressor impeller
9 Rotor shaft
10 External rotor
11 Double arrow
12 Double arrow
13 Coils
14 Magnets
15 Housing
16 Bearing device
17 Bearing position
18 Bearing position
19 Bearing element
20 First receiving chamber
21 Second receiving chamber
22 Through opening
23 Arrow
24 Impeller back
25 Wall region
26 Air duct
27 Arrow
28 Arrow
29 Guide duct
A1 First outer circumference
A2 Second outer circumference
L1 First length region
L2 Second length region
T Partial region

What is claimed is:

1. A compressor for an intake section of an internal combustion engine of a motor vehicle, comprising:
an electric motor which has a stator and a rotor, wherein the rotor is drivable by the stator and is rotatable about an axis of rotation relative to the stator; and
an impeller which is drivable by the rotor to compress air which is flowable through the intake section and which is to be supplied to a combustion chamber of the internal combustion engine;

wherein the rotor is a brushless external rotor such that at least one length region of the stator in a radial direction of the electric motor is outwardly covered by at least one length region of the rotor.

2. The compressor according to claim 1, wherein the stator has a plurality of coils which are suppliable with electric current.

3. The compressor according to claim 1, wherein the rotor has a plurality of magnets.

4. The compressor according to claim 1, wherein the rotor is at least partially accommodated in a housing and is mounted rotatably on the housing via a bearing device.

5. The compressor according to claim 4, wherein the bearing device has at least one plain bearing and/or at least one ceramic rolling bearing.

6. The compressor according to claim 4, wherein the housing has a first receiving chamber in which the impeller is disposed and a second receiving chamber in which the bearing device is disposed, wherein the rotor extends from the second receiving chamber through an opening into the first receiving chamber, and wherein the opening is completely covered by the impeller in a direction coinciding with an axial direction of the electric motor and pointing toward the impeller.

7. The compressor according to claim 6, wherein the impeller has an air duct which leads at a first end into the first receiving chamber and at a second end into the second receiving chamber and wherein via the air duct air from the first receiving chamber is conductible into the second receiving chamber such that the bearing device is coolable by the air.

8. The compressor according to claim 7, wherein the air duct is configured to compress air flowing through the air duct.

9. The compressor according to claim 7, wherein a wall region of the housing outwardly adjoining the opening in a radial direction of the electric motor and a partial region of an impeller back of the impeller, which partial region faces the wall region, bound a guide duct wherein via the guide duct at least some of the air from the first receiving chamber is conductible to the opening and through the opening.

10. The compressor according to claim 9, wherein the impeller is configured to convey air through the guide duct and to compress air flowing through the guide duct.

11. The compressor according to claim 6, wherein the housing has a first outer circumference in a first length region having the first receiving chamber and has a second outer circumference which is smaller than the first outer circumference in a second length region having the second receiving chamber.

12. An internal combustion engine for a motor vehicle, comprising:
    a combustion chamber;
    an intake section through which air is flowable and wherein via the intake section air is guidable into the combustion chamber; and
    a compressor which is disposed in the intake section, wherein the compressor includes:
    an electric motor which has a stator and a rotor, wherein the rotor is drivable by the stator and is rotatable about an axis of rotation relative to the stator; and
    an impeller which is drivable by the rotor;
    wherein the rotor is a brushless external rotor such that at least one length region of the stator in a radial direction of the electric motor is outwardly covered by at least one length region of the rotor.

13. A motor vehicle, comprising:
    the compressor according to claim 1 or the internal combustion engine according to claim 12.

* * * * *